(12) United States Patent
Norem et al.

(10) Patent No.: US 9,920,880 B2
(45) Date of Patent: Mar. 20, 2018

(54) DEAERATING ASSEMBLY

(75) Inventors: Dean A. Norem, Cherry Valley, IL (US); Timothy P. Walgren, Byron, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1365 days.

(21) Appl. No.: 13/350,919

(22) Filed: Jan. 16, 2012

(65) Prior Publication Data
US 2013/0180403 A1    Jul. 18, 2013

(51) Int. Cl.
| | | |
|---|---|---|
| *F16N 39/00* | (2006.01) | |
| *B64C 27/10* | (2006.01) | |
| *B64C 27/14* | (2006.01) | |
| *B01D 45/08* | (2006.01) | |
| *B64C 27/82* | (2006.01) | |
| *F16H 57/027* | (2012.01) | |

(52) U.S. Cl.
CPC ............ *F16N 39/002* (2013.01); *B64C 27/10* (2013.01); *B64C 27/14* (2013.01); *B01D 45/08* (2013.01); *B64C 2027/8236* (2013.01); *B64C 2027/8272* (2013.01); *B64C 2027/8281* (2013.01); *F16H 57/027* (2013.01)

(58) Field of Classification Search
CPC ....... F16N 39/002; B64C 27/14; B64C 27/10; B64C 2027/828; B64C 2027/8272; B64C 2027/8236; F16H 57/027; B01D 45/08
USPC .... 95/261, 242, 260; 96/204, 209, 210, 211, 96/212, 216, 177, 187; 184/6.23
See application file for complete search history.

(56) References Cited

U.S. PATENT DOCUMENTS

| | | | | |
|---|---|---|---|---|
| 2,183,034 A | * | 12/1939 | Voit | ..................... F02M 55/007 184/6.2 |
| 2,235,793 A | * | 3/1941 | Berger | ................. F01M 11/067 139/398 |
| 2,432,130 A | | 12/1947 | Serrell et al. | |
| 2,483,448 A | * | 10/1949 | Weitzen | .......................... 96/216 |
| 2,572,527 A | | 10/1951 | Sebald | |
| 2,575,568 A | * | 11/1951 | Topanelian, Jr. | ......... F02M 1/00 415/115 |
| 2,662,538 A | * | 12/1953 | Cervino | .................. B64D 37/02 137/45 |

(Continued)

FOREIGN PATENT DOCUMENTS

| | | | |
|---|---|---|---|
| EP | 2589885 A2 | * | 5/2013 |
| JP | 57144367 A | * | 9/1982 |

(Continued)

OTHER PUBLICATIONS

European Search Report for EP Application 12199089, completed Mar. 12, 2013.

(Continued)

*Primary Examiner* — Amber R Orlando
*Assistant Examiner* — Stephen Hobson
(74) *Attorney, Agent, or Firm* — Carlson, Gaskey & Olds, P.C.

(57) ABSTRACT

An example method of deaerating a mixture of fluid and air includes communicating a mixture of fluid and air directly against a wall of a reservoir to separate the fluid from the air. The method reuses the fluid held within the reservoir after the separating.

10 Claims, 7 Drawing Sheets

(56) References Cited

U.S. PATENT DOCUMENTS

| | | | | |
|---|---|---|---|---|
| 2,678,699 A | * | 5/1954 | Fowler | C10G 5/04 210/521 |
| 2,725,956 A | | 12/1955 | Cunningham | |
| 2,747,593 A | * | 5/1956 | Royer | B64C 11/42 137/45 |
| 2,753,011 A | * | 7/1956 | Downs | B64D 37/005 96/211 |
| 2,764,172 A | * | 9/1956 | Strayer | B64D 37/005 137/202 |
| 2,765,866 A | * | 10/1956 | Carroll, Jr. | B64D 37/22 137/45 |
| 2,793,708 A | * | 5/1957 | Carroll, Jr. | B64D 37/22 137/179 |
| 2,800,975 A | * | 7/1957 | Carroll, Jr. | B64D 37/22 137/45 |
| 2,811,218 A | * | 10/1957 | Winslow | B01D 19/0057 210/130 |
| 2,903,087 A | | 9/1959 | Glasgow | |
| 2,942,611 A | * | 6/1960 | Klank, Jr. | B64D 37/34 137/43 |
| 2,983,331 A | * | 5/1961 | Helsley, Jr. | B01D 19/0057 96/187 |
| 3,011,504 A | * | 12/1961 | Klank, Jr. | B64D 37/22 137/45 |
| 3,016,912 A | * | 1/1962 | Klank, Jr. | B64D 37/22 137/43 |
| 3,180,345 A | * | 4/1965 | Klank, Jr. | B64D 37/22 137/43 |
| 3,638,760 A | | 2/1972 | Lamm | |
| 3,768,726 A | | 10/1973 | Hale et al. | |
| 3,933,448 A | * | 1/1976 | Di Peri | B01D 19/0031 96/187 |
| 4,080,126 A | * | 3/1978 | Clark | B22F 9/082 264/12 |
| 4,179,340 A | * | 12/1979 | Limberg | C10L 331/00 202/262 |
| 4,287,913 A | * | 9/1981 | Bennett | B64D 37/22 137/43 |
| 4,339,401 A | * | 7/1982 | Clark | B22F 9/082 264/11 |
| 4,474,035 A | * | 10/1984 | Amin | F25B 43/006 55/391 |
| 4,600,413 A | | 7/1986 | Sugden | |
| 4,715,869 A | | 12/1987 | Ramshaw | |
| 4,947,963 A | * | 8/1990 | Aho, Jr. | F01D 25/18 184/6 |
| 4,962,829 A | | 10/1990 | Sugden | |
| 5,004,407 A | * | 4/1991 | Hutchison | 418/1 |
| 5,254,145 A | * | 10/1993 | Denece | B01D 19/0052 210/512.3 |
| 5,587,068 A | | 12/1996 | Aho, Jr. et al. | |
| 6,053,967 A | * | 4/2000 | Heilmann et al. | 96/208 |
| 6,974,542 B2 | * | 12/2005 | von Phul | B03D 1/02 210/221.2 |
| 7,988,772 B2 | * | 8/2011 | Garcia | B01D 45/12 184/6.23 |
| 8,366,809 B2 | * | 2/2013 | Rollins | B01D 19/0057 184/6.23 |
| 8,444,751 B2 | * | 5/2013 | Bell | B01D 19/0057 184/6.23 |
| 8,500,869 B1 | * | 8/2013 | Johnson et al. | 95/261 |
| 8,529,668 B2 | * | 9/2013 | Short et al. | 95/261 |
| 2002/0020385 A1 | * | 2/2002 | Stromsky | F01M 11/0004 123/196 R |
| 2008/0116009 A1 | * | 5/2008 | Sheridan | F01D 25/18 184/6.4 |
| 2011/0092875 A1 | * | 4/2011 | Beck | A61M 1/3627 604/6.09 |
| 2011/0162613 A1 | | 7/2011 | Schiffer et al. | |
| 2013/0240069 A1 | * | 9/2013 | Smith | F15B 21/044 137/574 |

FOREIGN PATENT DOCUMENTS

| | | |
|---|---|---|
| JP | S6223514 A | 1/1987 |
| JP | 11082353 A * | 3/1999 |

OTHER PUBLICATIONS

European Examination Report for Application No. 12199089.9 dated May 31, 2016.

\* cited by examiner

DEAERATING ASSEMBLY

BACKGROUND

This disclosure relates generally to deaerating a fluid and, more particularly, to deaerating the fluid without requiring a separate assembly dedicated to deaerating.

Fluid, such as oil, that has been used to cool and lubricate moving components is often recirculated. Fluid mixed with substantial amounts of air is less suitable for cooling and lubricating. Because the fluid mixes with air during use, the fluid is deareated prior to reuse.

Gearboxes include many rotating components that are cooled and lubricated with a fluid. After circulating through the gearbox, the fluid moves through a cylindrical deaerating structure to remove air. The fluid then flows from the deaerating structure to a holding reservoir where it is stored until being moved back into the gearbox.

SUMMARY

An example method of deaerating a mixture of fluid and air includes communicating a two-phase mixture of fluid and air directly against a wall of a reservoir to separate the air from the fluid. The method recirculates the fluid held within the reservoir after the separating.

A method of deaerating a mixture of aircraft lubricating fluid and air includes communicating the mixture into an open area of a reservoir. The method includes collecting the aircraft lubricating fluid in a lower portion of the reservoir and collecting the separated air in an upper portion of the reservoir that is different from the first portion. The method uses the aircraft lubricating fluid from the first portion to lubricate an aircraft component.

An example component lubrication assembly includes a reservoir providing a retention volume. An open, first area of the volume receives a mixture of a fluid that is not deaerated. A second area of the volume receives and holds the fluid that has been deaereated.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
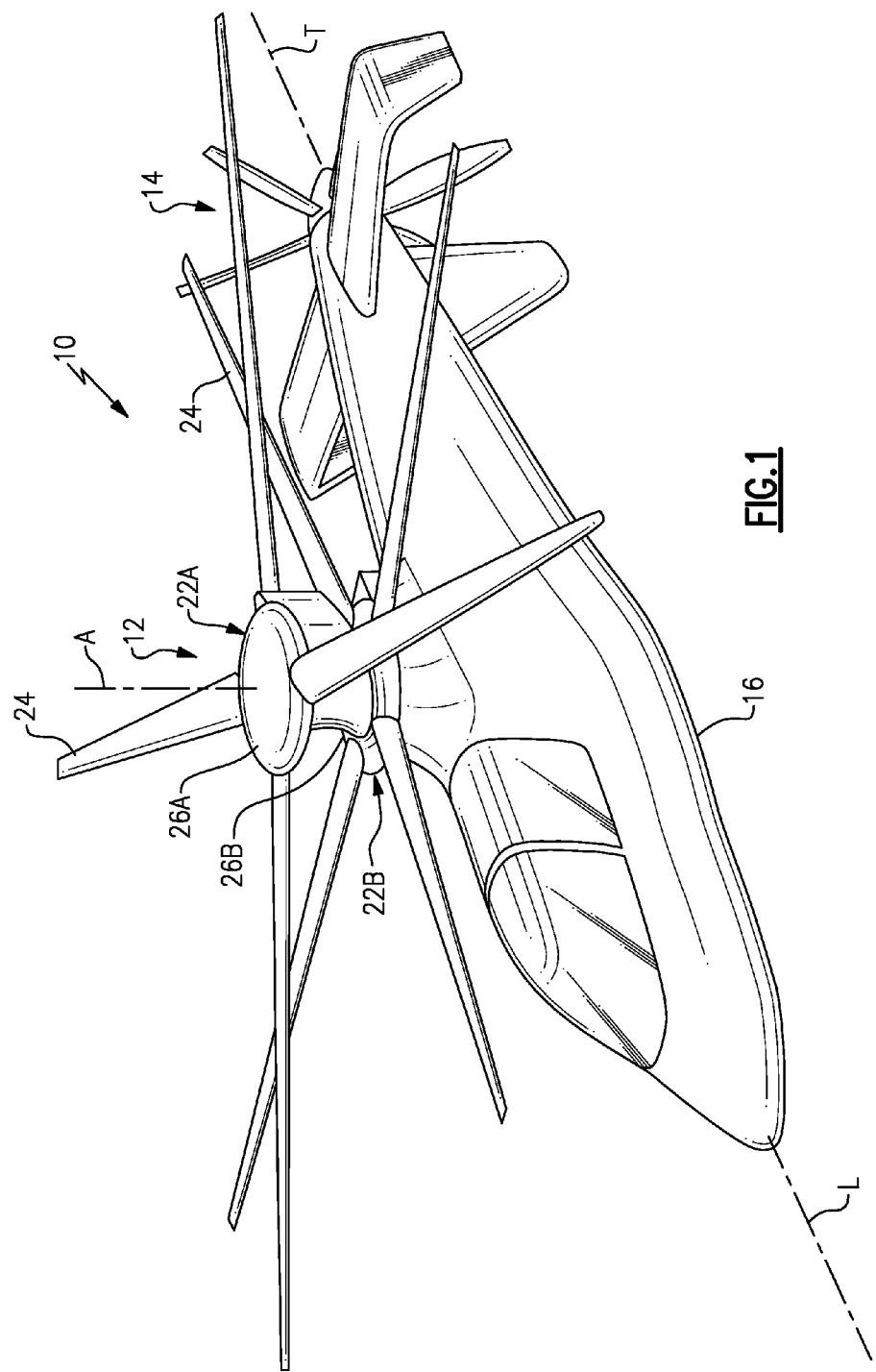
FIG. 1 is a perspective view of an example rotary wing aircraft.
Figure 2:
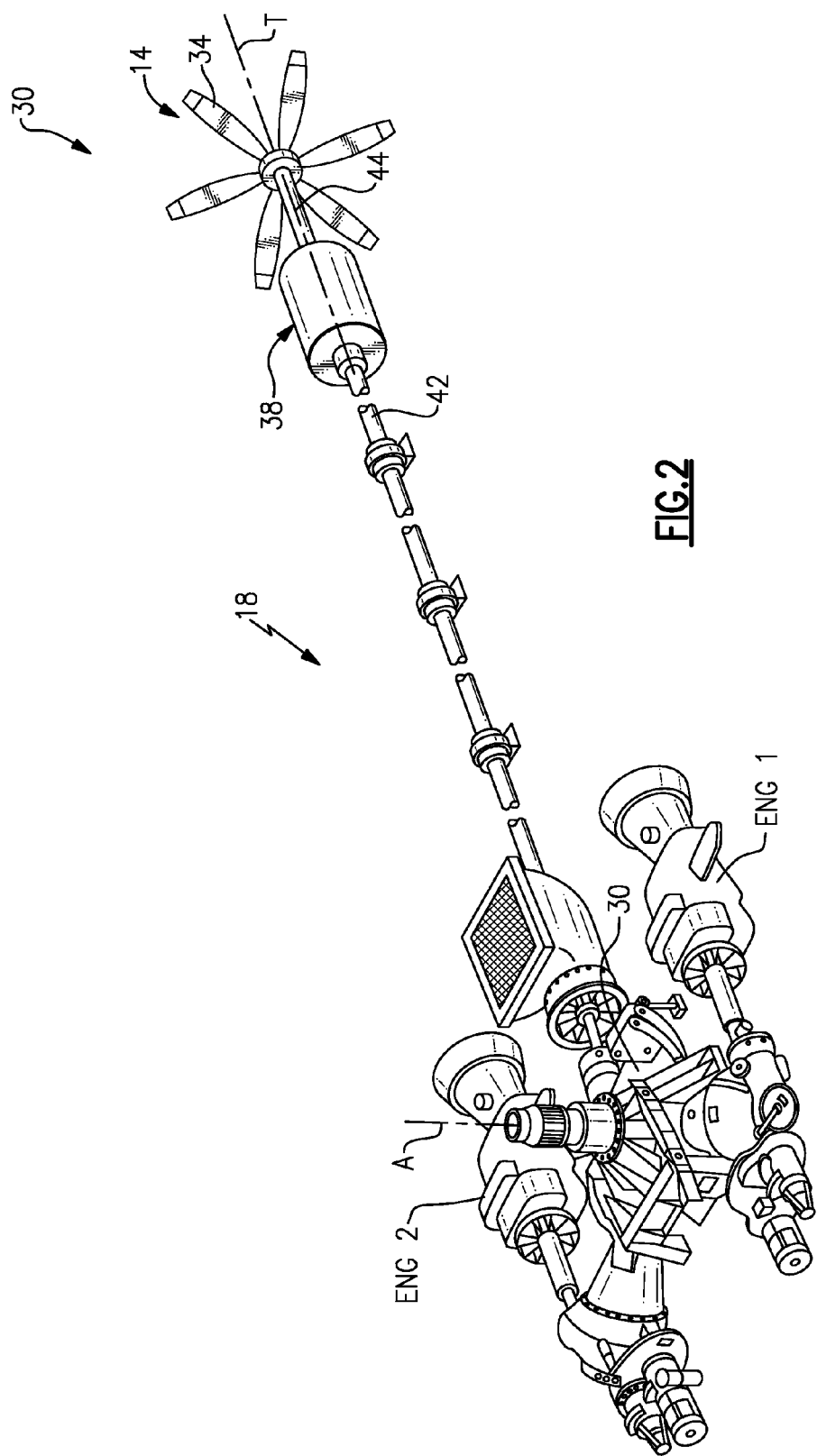
FIG. 2 is a perspective view of an example drive system for the FIG. 1 rotary wing aircraft.
Figure 3:
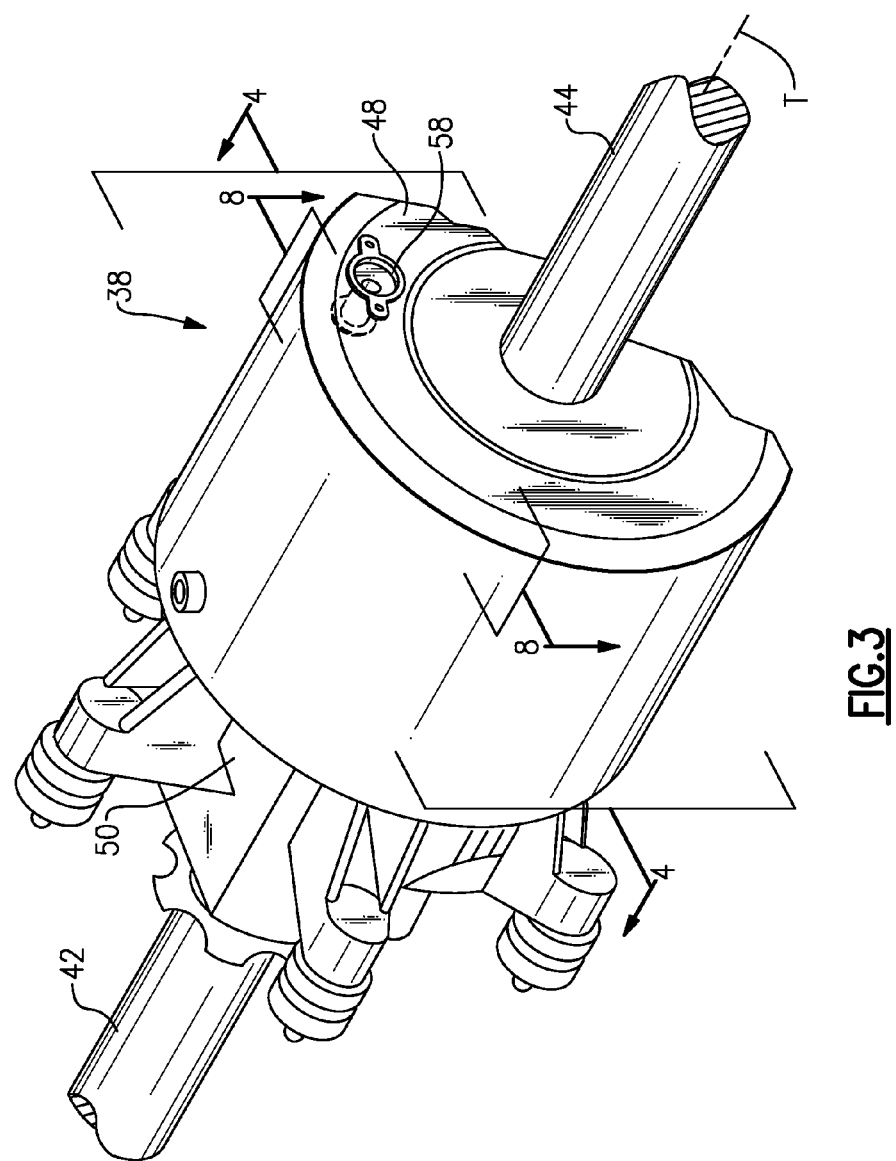
FIG. 3 is a perspective view of a secondary gearbox within the FIG. 2 drive system.
Figure 4:
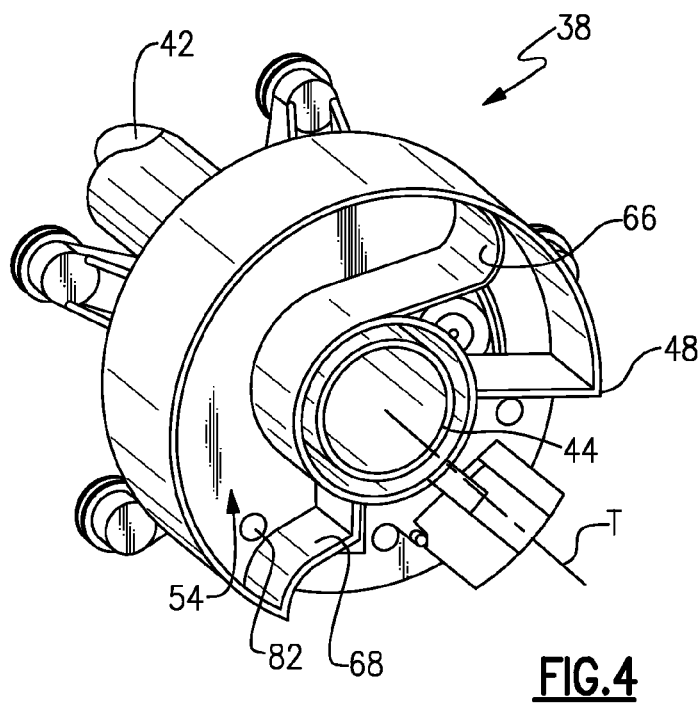
FIG. 4 is a section view in perspective at line 4-4 in FIG. 3.
Figure 6:
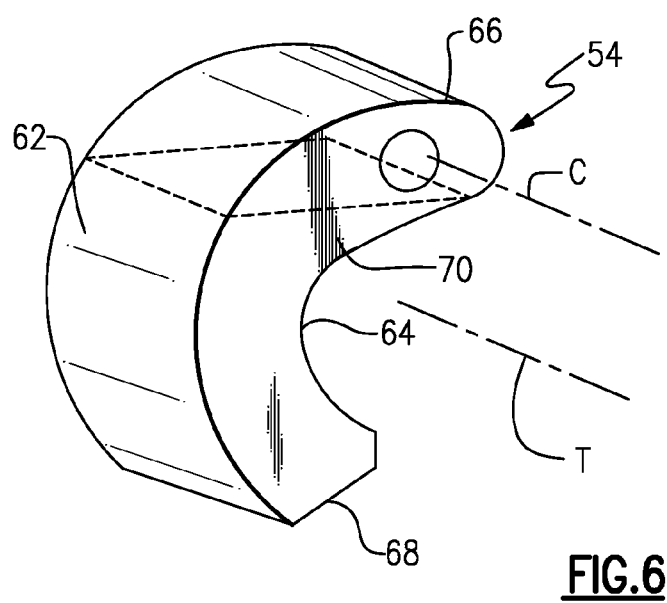
FIG. 6 is a perspective view representing a reservoir volume within the FIG. 3 secondary gearbox.
Figure 5:
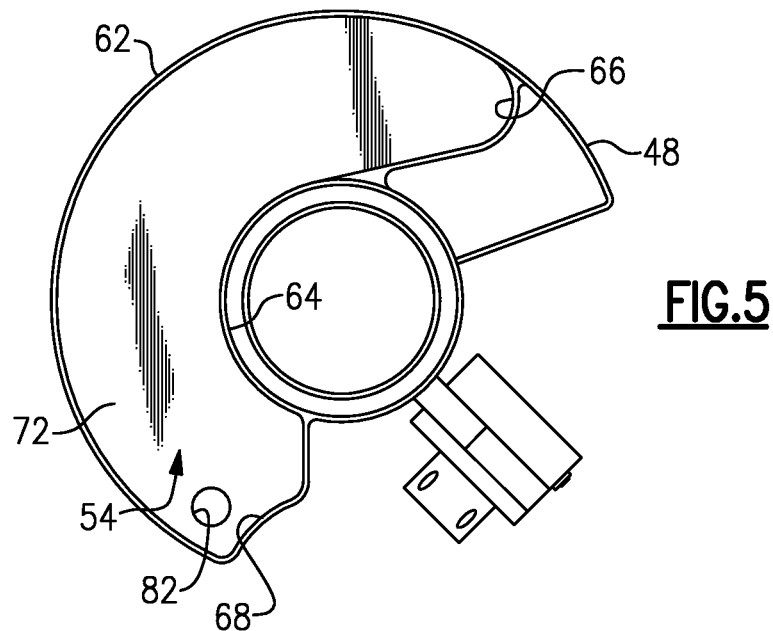
FIG. 5 is a true section view of the FIG. 4 section view.
Figure 7:
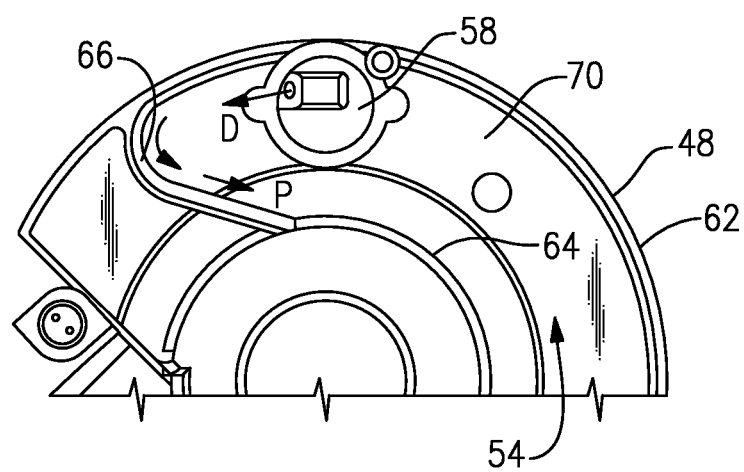
FIG. 7 is a section view at line 4-4 in FIG. 3 in an opposite direction from FIG. 5.

Referring to FIGS. 1 and 2, an example high-speed vertical takeoff and landing rotary-wing aircraft 10 has a counter-rotating, coaxial primary rotor system 12 and a secondary rotor system 14. The aircraft 10 includes an airframe 16 that supports a drive system 18 used to drive the primary rotor system 12 and the secondary rotor system 14. The primary rotor system 12 rotates about an axis of rotation A. The secondary rotor system 14 rotates about an axis of rotation T.

The primary rotor system 12 includes an upper rotor assembly 22A and a lower rotor assembly 22B. Each rotor assembly 22A and 22B includes a plurality of primary rotor blades 24 mounted to a respective upper rotor hub 26A or lower rotor hub 26B. The primary rotor blades 24 rotate with the respective hub 26A or 26B about the axis A. Any number of blades may be used within the primary rotor system 12.

The primary rotor system 12 is driven through a main gearbox 30 by a multi-engine power plant system having an engine package ENG1 and an engine package ENG2.

The multi-engine power plant system also provides a rotational input into the secondary rotor system 14. In this example, the secondary rotor system 14 includes a propeller pusher system 34 that provides translational thrust in a direction that is generally parallel to a longitudinal axis L of the aircraft 10. The secondary rotor system 14 provides thrust for high-speed flight of the aircraft 10, in this example.

To rotate the propeller pusher system 34, a secondary gearbox 38 steps down a rotational input from a main shaft 42 to rotate a secondary drive shaft 44 at a lower speed. The multi-engine power plant system drives the main shaft 42.

In this example, the secondary rotor system 14 is mounted to the rear of the airframe 16 with the rotational axis T oriented substantially horizontal and parallel to the axis L. Other configurations of the secondary rotor system 14, such as a propeller system mounted to each side of the airframe 16 may alternatively be used.

The following examples are disclosed with reference to the secondary gearbox 38 of the aircraft 10. Although a particular aircraft and environment is illustrated and described, other configurations, machines, or both may incorporate rotatable components suitable for use with the examples disclosed herein. For example, other moving components, and other gearboxes, may benefit from the following examples. Other types of aircraft, and other types of machines may also benefit.

Referring now to FIGS. 3-11 with continuing reference to FIGS. 1 and 2, the secondary gearbox 38 includes a secondary driveshaft housing 48 and a gear housing 50. Fluid, such as a lubricating oil, circulates through the gear housing 50 to cool and lubricate the gears and bearings (not shown) within the gear housing 50. As known, the fluid becomes mixed with air when cooling and lubricating the gears and bearings. It is further blended and mixed during the fluid recovery process, where the scavenge pumps pull the oil and air in varying proportions from the bottom of the gear cavity.

Fluid that exits the gear housing 50 is collected and recirculated. However, the reused fluid re-entering the gear housing 50 is typically reasonably void of air content. Fluid mixed with significant amounts of air is less suitable for cooling and lubricating the gears and bearings as is known. Circulation systems employing other details such as control circuits and valves are more sensitive to air content due to the compressibility of that media.

To remove air from the mixed fluid, the fluid is deaerated prior to circulation back to the gear housing 50. A person having skill in this art and the benefit of this disclosure would understand how much air would need to be separated from the fluid to make the fluid suitable for lubricating and cooling gears within the gear housing 50.

In this example, a nozzle 58 introduces the mixture of fluid and air to the reservoir 54. The mixture is collected using a scavenge pump within the gear housing 50 and is communicated directly from the gear housing 50 to the reservoir 54. The manner in which the mixture is introduced to the reservoir 54 encourages air to separate from the fluid.

The example reservoir 54 includes an outer curved wall 62 and an inner curved wall 64. The outer wall 62 is "outer" relative to the inner wall 64 with reference to axis T. Radially extending walls 66 and 68 connect the outer wall 62 to the inner wall 64. Axially facing end walls 70 and 72 complete the reservoir 54.

As can be appreciated from the Figures, the outer wall 62 and the inner wall 64 are curved such that a volume established by the reservoir 54 extends circumferentially around a portion of the axis T. Notably, the volume is continuous and uninterrupted. That is, other than the walls, inlet structures, and outlet structures, there are no additional structures or features extending into, or disposed within, the volume of the reservoir. The reservoir 54 is integrated within the secondary driveshaft housing 48.

In this example, the radial wall 68 is located at a vertical bottom of the reservoir 54 and the radial wall 66 is located near a vertical top of the reservoir 54. Relative vertical positions, in this example, refer to the aircraft 10 being on the ground or in straight (or level) flight. Since the aircraft 10 maintains a relatively consistent attitude during flight, the relative vertical positions of the end wall 68 and 66 are maintained during flight. Where flight angles might vary from that vertical orientation, the nature of the coordinated maneuvers generates a G-vector on the fluids that emulates the relative orientation for the fluid volumes.

Fluid pools at the vertical bottom of the reservoir 54 due to gravity. The wall 68 is thus typically submersed by fluid. The radial wall 66 is, in this example, located vertically above the normal maximum level of fluid held within the reservoir 54. Accordingly, during normal operation, the wall 66 is in an open area of the reservoir 54. (The open area is an area without pooled fluid.) Notably, the vertical form of the reservoir 54 improves separation and stratification of varying densities of flow mixture, such as fine air entrainment that can lead to foaming.

The example radial wall 66 is curved and has a general C-shape. The radial wall 66 is curved relative to an axis C that is parallel to the axis T.

The nozzle 58, which is aluminum in this example, includes a conduit portion 74 that creates a nozzle jet which directs the mixture from the nozzle 58 in the direction D toward the radial wall 66. The mixture is introduced into an open area of the reservoir 54.

The nozzle 58 receives the mixture from the gear housing 50 via a flow conduit 76. In this example, the nozzle 58 is located on an opposite axial end of the secondary driveshaft housing 48 from the gear housing 50, thus the conduit 76 extends axially across the entire length of the reservoir section of the secondary driveshaft housing 48.

Figure 9:
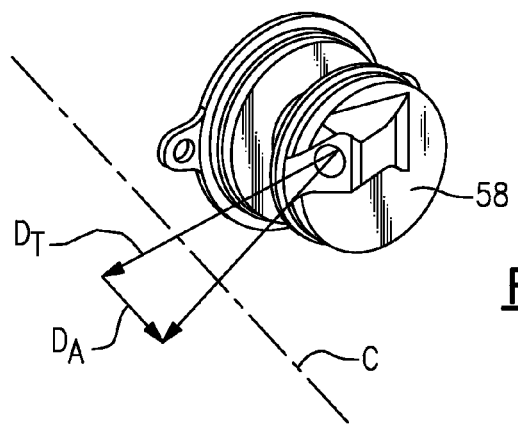
FIG. 9 is a perspective view of a nozzle of the FIG. 3 secondary gearbox.
Figure 8:
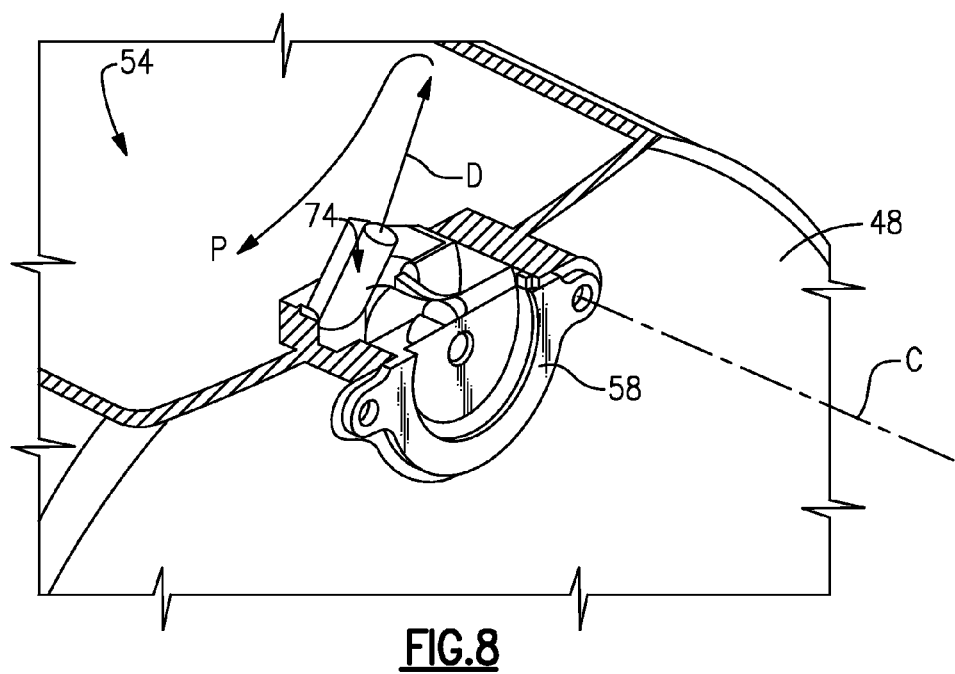
FIG. 8 is a section view at line 8-8 in FIG. 3.
Figure 10:
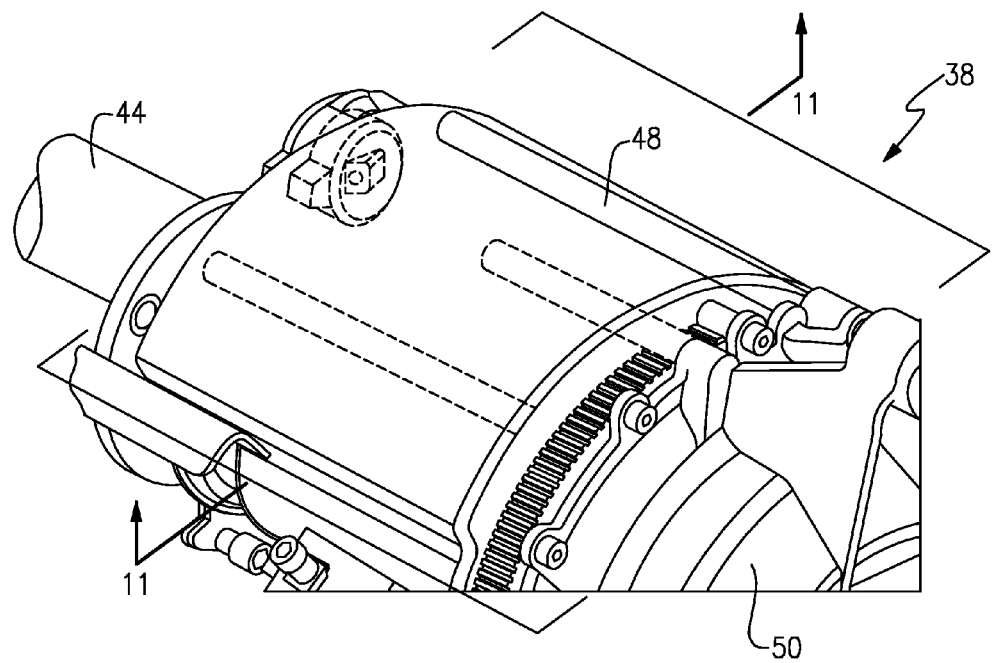
FIG. 10 is a perspective view of a portion of the FIG. 3 secondary gearbox opposite the direction of view in FIG. 3.
Figure 11:
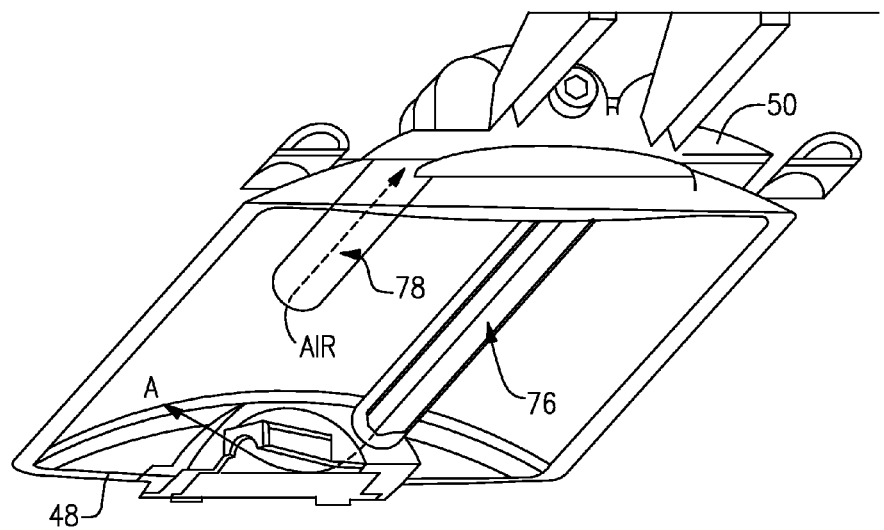
FIG. 11 is a section view at line 11-11 in FIG. 10.

In this example, the mixture of oil and air from the gear housing 50 is introduced to the reservoir 54 at a relatively high flow rate so that the mixture exits from the nozzle 58 at a suitable velocity and impinges onto the radial wall 66. The curvature of the radial wall 66 is paired with the flow velocities to ensure suitable centrifugal forces and adequate separation. Notably, the direction D has a vector component $D_A$ that is parallel to the axis C, and a vector component $D_T$ that is tangential to the partial cylinder about axis C (FIG. 9).

The mixture flows along path P after impinging upon the end wall 66. The mixture moves tangentially and axially relative to the axis C as the mixture is centrifuged by the contour of the wall.

Primary separation of the air from the fluid is encouraged by the curved contour and the contact with the curved radial wall 66. This half-curl centrifuge causes the denser fluid to be flung outward onto the outer wall and coalesced, which displaces the less dense air and prompting it to move inward toward the rotational center of the curved flow. The principally separated and coalesced fluid flows downward within the reservoir 54 along the sloped portion of the wall 66, against the inner wall 64, and into the fluid collected at the vertical bottom of the reservoir 54. The principally separated fluid flows as a widening sheet against the end wall 66 and the inner wall 64. The progressively widening of the sheet flow permits the flow to get thinner, and further encourages the separation of the finer air bubbles within the principally separated fluid. The increased contact area of the flow reduces its velocity, providing for more peaceful entry into the collected fluid volume. The separated air rises and collects within the open area.

In this example, the sheet flow improves separation of the fluid and the air. The sheet flow is relatively thin, which shortens the travel path for the air to separate from the fluid. The relatively thin sheet means even smaller bubbles are released compared to thicker layers of flow. Further, the sheet flow, in this example, is spread across a relatively wide surface area, which provides more of a boundary layer against the walls, yields reduced velocity of flow, and eases entry into solid oil volume. Because the entry is eased, there is less agitation related to entry into the separated and collected fluid. Thus, less air is re-introduced.

Typical prior art deaerators sustain flow velocity thru to discharge, leaving a very active spray and potential for churn, which can introduce air back into the fluid.

During operation of the secondary gearbox 38, air collected in the open area of the reservoir 54 vents back to the gear housing 50 through an air conduit 78.

During operation of the secondary gearbox, fluid is pumped from a vertical bottom of the reservoir and reintroduced into the gear housing 50. The reintroduced fluid is used for cooling, lubrication, or both.

A fluid pump may be used to communicate fluid from the reservoir 54 to the gear housing 50. Positioning the reservoir fluid outlet 82 (pump inlet) near the vertical bottom of the reservoir 54 further improves separation of the air bubbles from the fluid, and helps lessen the chance that air becomes part of the cooling flow and is reintroduced to the gear housing 50 through the fluid outlet 82.

Features of the disclosed examples include introducing a mixture of air and fluid into an open area of a reservoir in a way that encourages the separation of air from the fluid. Notably, no separate deaerating structure is required to encourage such separation. Also, no such separate deaerating structure is positioned within the reservoir. Further, secondary aeration of separated fluid is minimized by easing flow entry into the collected fluid volume.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of deaerating a mixture of aircraft lubricating fluid and air, comprising:
   communicating the mixture into an open area of a continuous and uninterrupted reservoir and against a wall of the reservoir, the wall being curved about an axis;
   collecting the aircraft lubricating fluid in a first portion of the reservoir;
   collecting the air in a second portion of the reservoir that is different from the first portion; and
   using the aircraft lubricating fluid from the first portion to lubricate an aircraft component.

2. A component lubrication assembly, comprising:
   a continuous and uninterrupted reservoir having a wall curved about an axis and providing a volume, wherein an open, first area of the volume receives a mixture of a fluid that is not deaerated, and a second area of the volume holds the fluid that has been deaerated; and
   a nozzle that communicates the mixture against the wall of the continuous and uninterrupted reservoir with a directed vector flow.

3. The component lubrication assembly of claim 2, including a component that is lubricated, cooled, or both by the fluid that has been deaerated.

4. The component lubrication assembly of claim 3, wherein the component is a rotating component within a gearbox.

5. The component lubrication assembly of claim 4, wherein the continuous and uninterrupted reservoir has a radially outer wall and a radially inner wall joined by curved end walls that face circumferentially relative to an axis of a rotatable shaft driven by the gearbox.

6. The component lubrication assembly of claim 5, wherein the nozzle introduces the mixture into the continuous and uninterrupted reservoir in a direction having a first component aligned with the axis and a second component tangential to the axis.

7. The component lubrication assembly of claim 5, wherein the nozzle communicates the mixture against a first one of the curved end walls.

8. The component lubrication assembly of claim 7, wherein the first one of the curved end walls is located near a vertical top of the continuous and uninterrupted reservoir.

9. The method of claim 5, wherein the nozzle communicates the mixture along a circumferential direction relative to the axis of the rotatable shaft.

10. The component lubrication assembly of claim 5, wherein the curved end walls are generally C-shaped.

* * * * *